Jan. 18, 1927.
B. J. EGERT
1,614,605
MEASURING DEVICE
Filed August 5, 1921
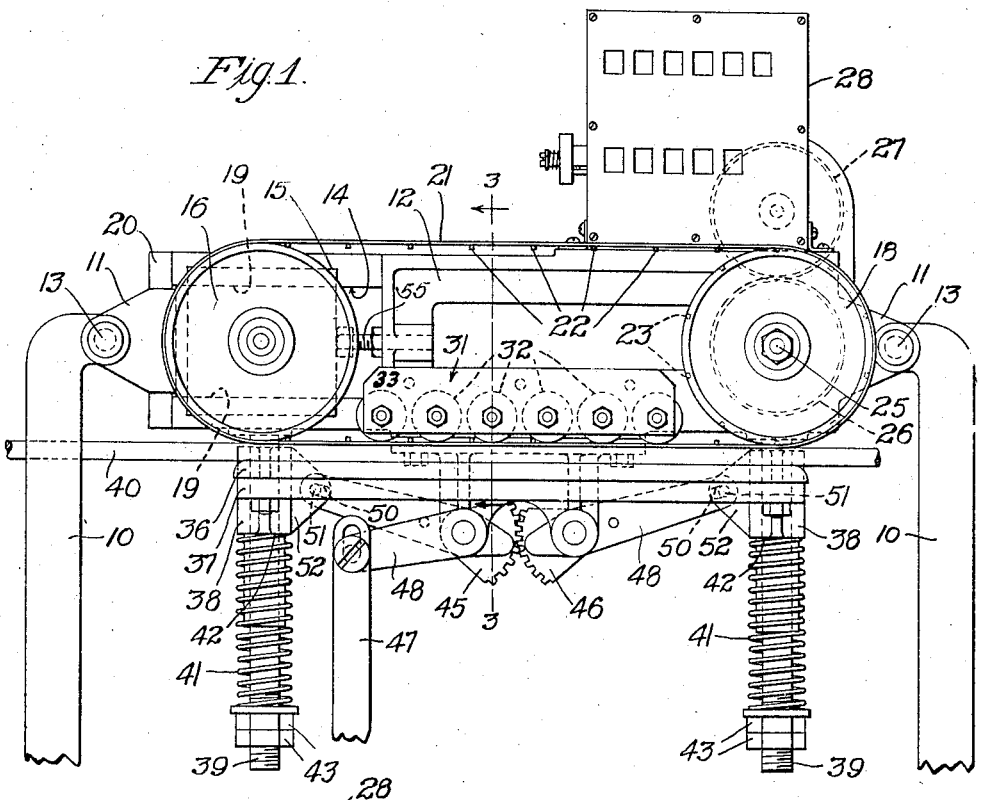
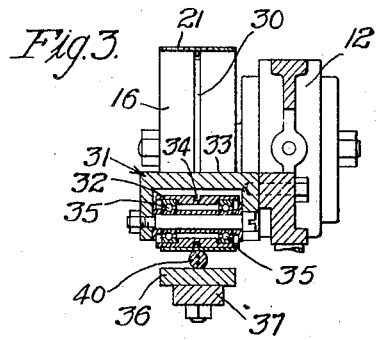
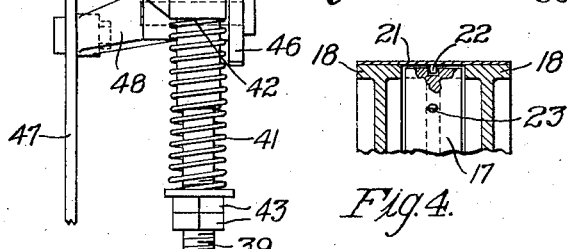
Inventor
Benjamin J. Egert
by G. M. Campbell
Atty.

Patented Jan. 18, 1927.

1,614,605

UNITED STATES PATENT OFFICE.

BENJAMIN JONES EGERT, OF BROOKFIELD, ILLINOIS, ASSIGNOR TO WESTERN ELECTRIC COMPANY, INCORPORATED, OF NEW YORK, N. Y., A CORPORATION OF NEW YORK.

MEASURING DEVICE.

Application filed August 5, 1921. Serial No. 490,000.

This invention relates to measuring devices for measuring the length of longitudinally moving cords, ropes, cables or the like.

The object of this invention in general is to provide a driving mechanism actuated by the movement of the article to be measured, which will cause a counter connected therewith to accurately register the length of a cable or the like moving in engagement with the driving mechanism.

In accordance with the general features of this invention there is provided a suitable register driven from the traveling cable, or the article to be measured, through the agency of connecting means. The connecting means between the cable or article to be measured and the register comprises an endless traveling member, preferably a steel tape, provided with engaging surfaces and running over wheels, one of which is connected to the register and is provided with surfaces adapted to be engaged by the engaging surfaces on the steel tape. To prevent slippage between the cable and the tape there is provided a stationary support, which is preferably spring supported and over which the cable is drawn and pressed into driving engagement with the driving mechanism.

In the drawings illustrating this invention:

Fig. 1 is a front elevation of the complete device with part of a link for moving a guide and of standards for supporting the device broken away;

Fig. 2 is a partial right hand end view thereof;

Fig. 3 is a vertical sectional view on the line 3—3 of Fig. 1, looking in the direction indicated by the arrows, and Fig. 4 is a partial detail sectional view of the wheel which is connected to the register showing the engagement of the tape with the wheel.

As illustrated in Fig. 1, the complete device is supported upon the standards 10 which are suitably secured to the floor or any supporting means. At their upper ends the standards 10 are secured to lugs 11 on a frame 12 by pins 13. The frame 12 is forked at one end, as indicated at 14, to carry a take-up bearing 15 which carries an idler wheel 16 and at its opposite end the frame 12 carries a second wheel 17 (Fig. 2) of slightly smaller diameter, with an idler wheel 18 of the same diameter as the wheel 16 at each side and carried loose on the same shaft. The take-up bearing 15 slides on rails 19 which form the side members of the forked end 14 of the frame 12. The forked end 14 is closed by a cross piece 20 which is secured to the frame 12. Passing around the idler wheels 16 and 18 is a tape 21, preferably of steel, equipped with equally spaced inwardly projecting pins or teeth 22, 22 which engage depressions 23, 23 similarly spaced in the peripheral surface of the wheel 17. The peripheral surface of the wheel 17 does not engage the tape 21 but the pins 22, 22 thereon enter the depressions 23, 23 in the peripheral surface of the wheel 17, thereby causing the wheel 17 to revolve when the tape is moved. The wheel 17 is secured to a shaft 25 which also supports the idler wheels 18, 18. The shaft 25 is extended back of the frame 12 and carries a gear 26 which drives a gear 27 mounted on the main drive shaft of a counter 28 of the "Durant" or some other suitable type which is secured to the frame 12. The wheel 16 is provided with a groove 30 (as shown in Fig. 3) around which the pins or teeth 22, 22 idly pass when the device is operated.

Intermediate the wheels 16 and 17 and in contact with the lower inside surface of the tape 21 is a stationary roller guide 31 comprising a plurality of rollers 32, 32 carried in a frame 33 secured to the main frame 12. The rollers 32 are each provided with a groove 34 (Fig. 3) through which the pins or teeth 22, 22 on the tape 21 idly pass during operation.

The rollers 32 roll on roller bearings 35, as clearly shown in Fig. 3. The function of the roller bearings 35 is to reduce to a minimum the friction between the rollers 32 and the tape 21 and at the same time to allow pressure to be applied on the tape 21.

A lower guide 36 is secured to a support 37 which is provided at each end with a downwardly projecting sleeve-like portion 38 which is adapted to slide upon a stud 39, one at each side of the frame 12 and secured to the lower surface thereof. The lower guide 36 and the support 37 are forced upwardly upon the studs 39, to press upon a cable 40 to be measured, by springs 41 surrounding the studs 39 and bearing between a shoulder 42 on the sleeve-like portion 38 and adjustable nuts 43 screw-threaded onto the lower ends of the studs 39. To move the guide 36 downwardly without causing the sleeve-like portion 38 to bind on the studs 39 there are provided gear sectors 45 and 46. The gear sector 45 is connected to a link 47 which is suitably connected to a foot treadle or other suitable operating means. The sectors 45 and 46 are each equipped with an arm 48 which is provided with a slot 50 at its end which is engaged by a pin 51 secured in a lug 52 formed on each sleeve-like portion 38 of the support 37. By moving the link 47 downward the gear sectors through their engagement and the arms 48 carried thereby draw the support 37 and guide 36 downwardly against the tension of the springs 41 without varying the horizontal position thereof.

In operation the cable 40 which is to be drawn from a machine is run between the tape 21 and the lower guide 36 which at the time of inserting the cable is in its down position. The lower guide is now allowed to move up by the action of the springs 41, 41 after releasing the link 47. As the cable is drawn the tape will move with it, due to the pressure of the lower guide 36 upon the cable, and through the pins 22, 22 thereon engaging the notched wheel 17 the gears 26 and 27 will drive the counter 28 which will register the exact number of feet drawn. The tape being supported on the idler wheels 18—18 and spaced from the driving wheel 17 with only the pins 22, 22 engaging in the depressions 23, 23 there is no binding of the tape on the wheel 17, which would happen if the tape was in engagement with the peripheral surface of the wheel 17 and the pins 22, 22 thereon engaging the depressions 23, 23.

The take-up bearing 15 carrying the wheel 16 may be adjusted toward and from the wheels 17 and 18 by turning a screw 55 threaded into the frame 12 with its head in contact with the end of the take-up bearing 15 as clearly indicated in Fig. 1. By adjusting the screw 55 it will readily be seen that the steel tape 21 may be given the requisite tautness to function properly.

What is claimed is:

1. In a device for measuring the length of cable or like articles, an endless movable steel tape rotatably mounted for contact with the article and adapted to be moved thereby, a guide member for holding the article against said tape and upon which the article travels, and a register driven by means operatively connecting it with said endless movable steel tape.

2. In a device for measuring the length of cable or like articles, an endless movable steel tape in contact with the cable and adapted to be moved thereby, revolvable supporting wheels for said tape, a wheel adapted to be driven by the movement of said tape, a support upon the inside of said tape, a guide member upon which the cable travels, and a register driven by the wheel moved by the tape.

3. In a device for measuring the length of cable or like articles, an endless movable steel tape in contact with the cable and adapted to be moved thereby, revolvable supporting wheels for said tape, one of said wheels adapted to be adjusted toward and from the other wheel, a wheel adapted to be driven by the movement of said tape, a support upon the inside of said tape, a guide member upon which the cable travels, and a register driven by the wheel moved by the tape.

4. In a device for measuring the length of cable or like articles, an endless movable steel tape in contact with the cable and adapted to be moved thereby, revolvable supporting wheels for said tape, a wheel adapted to be driven by the movement of said tape, a stationary support upon the inside of said tape and in contact with the lower inside surface thereof, a spring supported guide member upon which the cable travels, and a register driven by the wheel moved by the tape.

5. In a device for measuring the length of cable or like articles, an endless movable steel tape in contact with the cable and adapted to be moved thereby, revolvable supporting wheels over the peripheral surface of which said tape runs, one of said wheels adapted to be adjusted toward and from the other wheel, a wheel adapted to be driven by the movement of said tape, a stationary roller support upon the inside of said tape, a spring supported guide member upon which the cable travels, and a register driven by the wheel moved by the tape.

6. In a device for measuring the length of cable or like articles, an endless movable steel tape in contact with the cable and adapted to be moved thereby, said tape having engaging surfaces, revolvable supporting wheels for said tape, a wheel provided with engageable surfaces adapted to be engaged by engaging surfaces upon said tape and driven by the movement thereof, a guide member upon which the cable travels, and a register driven by the wheel moved by the tape.

7. In a device for measuring the length of cable, an endless movable steel tape in contact with the cable and adapted to be moved thereby, said tape having engaging surfaces, revolvable support for said tape, a wheel associated with said revolvable supports but of smaller diameter and provided with engageable surfaces adapted to be engaged by engaging surfaces upon said tape and driven by the movement thereof, a guide member upon which the cable travels, and a register driven by the wheel moved by the tape.

8. In a device for measuring the length of cable, an endless movable steel tape in contact with the cable and adapted to be moved thereby, said tape having engaging surfaces, revolvable supporting wheels for said tape, a shaft for carrying a pair of said supporting wheels idle thereon, a wheel secured to said shaft between a pair of said supporting wheels of smaller diameter than said supporting wheels and provided with engageable surfaces adapted to be engaged by engaging surfaces upon said tape and driven by the movement thereof, a guide member upon which the cable travels, and a register driven by the wheel moved by the tape.

9. In a device for measuring the length of cable or like articles, a tape having projections thereon supported at separated points to present a continuous unbroken surface therebetween for contact with the article and adapted to be moved thereby, a guide member for holding the article against said tape, a rotary element having recesses to receive the projections on the tape whereby it is rotated by a movement of the tape, and a register driven by said rotary element.

10. In a device for measuring the length of cable or like articles, an endless tape in contact with the cable and adapted to be moved thereby, revolvable wheels for supporting said tape with a continuous unbroken surface between the wheels for engaging the cable, a wheel adapted to be driven by the movement of said tape, a guide member for holding the cable against the tape, and a register driven by the wheel moved by the tape.

11. In a device for measuring the length of cable, a tape in contact with the cable and adapted to be moved thereby, said tape having engaging surfaces, revolvable supporting wheels for said tape, a shaft for carrying a pair of supporting wheels idle thereon, a wheel secured to said shaft between a pair of said supporting wheels of smaller diameter than said supporting wheels and provided with engageable surfaces adapted to be engaged by engaging surfaces upon said tape and driven by the movement thereof, a guide member upon which the cable travels, and a register driven by the wheel moved by the tape.

In witness whereof, I hereunto subscribe my name this 26th day of July, A. D. 1921.

BENJAMIN JONES EGERT.